(12) United States Patent
McKee et al.

(10) Patent No.: US 7,890,960 B2
(45) Date of Patent: *Feb. 15, 2011

(54) EXTENSIBLE USER CONTEXT SYSTEM FOR DELIVERY OF NOTIFICATIONS

(75) Inventors: Timothy P. McKee, Seattle, WA (US); Fabrice A. Debry, Bellevue, WA (US); Cornelis K. Van Dok, Bellevue, WA (US); Randall K. Winjum, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

This patent is subject to a terminal disclaimer.

(21) Appl. No.: 10/402,075

(22) Filed: Mar. 26, 2003

(65) Prior Publication Data
US 2004/0194110 A1    Sep. 30, 2004

(51) Int. Cl.
G06F 3/00 (2006.01)
G06F 9/44 (2006.01)
G06F 9/46 (2006.01)
G06F 13/00 (2006.01)
(52) U.S. Cl. .................. 719/318; 719/320; 709/207
(58) Field of Classification Search ......... 719/310–320; 709/207
See application file for complete search history.

(56) References Cited

U.S. PATENT DOCUMENTS

| 5,461,710 A | 10/1995 | Bloomfield et al. |
| 5,493,692 A | 2/1996 | Theimer et al. |
| 5,499,364 A | 3/1996 | Klein et al. |
| 5,513,306 A | 4/1996 | Mills et al. |
| 5,559,948 A | 9/1996 | Bloomfield et al. |
| 5,598,524 A | 1/1997 | Johnston, Jr. et al. |

(Continued)

FOREIGN PATENT DOCUMENTS

WO    9938092    7/1999

(Continued)

OTHER PUBLICATIONS

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.

(Continued)

Primary Examiner—Diem K Cao
(74) Attorney, Agent, or Firm—Shook, Hardy & Bacon L.L.P.

(57) ABSTRACT

A system for controlling the delivery of notifications. The system brokers and serializes the delivery of notifications from multiple sources. In addition, a shared notion of user context is provided, for determining the appropriate handling for each of the notifications. In one embodiment, a user context consists of a condition that may be true or false, and an instruction that is to be followed if the condition is true. For example, if a user is listening to music, the instruction may be to show the notification on the screen but not play any sound for the notification. A user's contexts are declared by the operating system and arbitrary programs. The user's contexts may be presented to the user for modification in accordance with the user's preferences. The user may also define rules, which dictate how notifications that contain specified elements should be handled, and may provide exceptions to the instructions of the user's contexts.

13 Claims, 10 Drawing Sheets

U.S. PATENT DOCUMENTS

| | | | |
|---|---|---|---|
| 5,630,042 | A | 5/1997 | McIntosh et al. |
| 5,680,563 | A | 10/1997 | Edelman |
| 5,696,486 | A | 12/1997 | Poliquin et al. |
| 5,757,925 | A | 5/1998 | Faybishenko |
| 5,835,094 | A | 11/1998 | Ermel et al. |
| 5,838,322 | A | 11/1998 | Nakajima et al. |
| 5,867,163 | A | 2/1999 | Kurtenbach |
| 5,923,328 | A | 7/1999 | Griesmer |
| 5,935,210 | A | 8/1999 | Stark |
| 6,008,806 | A | 12/1999 | Nakajima et al. |
| 6,021,262 | A | 2/2000 | Cote et al. |
| 6,023,708 | A | 2/2000 | Mendez et al. |
| 6,037,944 | A | 3/2000 | Hugh |
| 6,097,389 | A | 8/2000 | Morris et al. |
| 6,147,601 | A | 11/2000 | Sandelman et al. |
| 6,181,342 | B1 | 1/2001 | Niblack |
| 6,185,603 | B1* | 2/2001 | Henderson et al. .......... 709/206 |
| 6,240,421 | B1 | 5/2001 | Stolarz |
| 6,246,411 | B1 | 6/2001 | Strauss |
| 6,308,173 | B1 | 10/2001 | Glasser et al. |
| 6,317,142 | B1 | 11/2001 | Decoste et al. |
| 6,341,280 | B1 | 1/2002 | Glass et al. |
| 6,363,400 | B1 | 3/2002 | Chtchetkine et al. |
| 6,437,807 | B1 | 8/2002 | Berquist et al. |
| 6,448,985 | B1 | 9/2002 | McNally |
| 6,453,311 | B1 | 9/2002 | Powers, III |
| 6,453,319 | B1 | 9/2002 | Mattis et al. |
| 6,466,932 | B1 | 10/2002 | Dennis et al. |
| 6,526,399 | B1 | 2/2003 | Coulson et al. |
| 6,535,230 | B1 | 3/2003 | Celik |
| 6,563,514 | B1 | 5/2003 | Samar |
| 6,573,906 | B1 | 6/2003 | Harding et al. |
| 6,583,799 | B1 | 6/2003 | Manolis et al. |
| 6,590,585 | B1 | 7/2003 | Suzuki et al. |
| 6,606,105 | B1 | 8/2003 | Quartetti |
| 6,628,309 | B1 | 9/2003 | Dodson et al. |
| 6,662,198 | B2 | 12/2003 | Satyanarayanan et al. |
| 6,735,623 | B1 | 5/2004 | Prust |
| 6,738,770 | B2 | 5/2004 | Gorman |
| 6,745,206 | B2 | 6/2004 | Mandler et al. |
| 6,762,777 | B2 | 7/2004 | Carroll |
| 6,763,458 | B1 | 7/2004 | Watanabe et al. |
| 6,784,900 | B1 | 8/2004 | Dobronsky et al. |
| 6,795,094 | B1 | 9/2004 | Watanabe et al. |
| 6,816,863 | B2 | 11/2004 | Bates et al. |
| 6,871,348 | B1 | 3/2005 | Cooper |
| 6,883,009 | B2 | 4/2005 | Yoo |
| 6,883,146 | B2 | 4/2005 | Prabhu et al. |
| 6,906,722 | B2 | 6/2005 | Hrebejk et al. |
| 6,938,207 | B1 | 8/2005 | Haynes |
| 6,947,959 | B1 | 9/2005 | Gill |
| 6,950,818 | B2 | 9/2005 | Dennis et al. |
| 6,952,724 | B2 | 10/2005 | Prust |
| 6,980,993 | B2 | 12/2005 | Horvitz et al. |
| 6,988,128 | B1* | 1/2006 | Alexander et al. .......... 709/206 |
| 7,010,755 | B2 | 3/2006 | Anderson et al. |
| 7,051,291 | B2 | 5/2006 | Sciammarella et al. |
| 7,139,811 | B2 | 11/2006 | Lev Ran et al. |
| 7,203,948 | B2* | 4/2007 | Mukundan et al. .......... 719/330 |
| 7,363,594 | B1* | 4/2008 | Wright et al. ............... 715/751 |
| 2001/0056508 | A1* | 12/2001 | Arneson et al. ............. 709/318 |
| 2002/0046232 | A1 | 4/2002 | Adams et al. |
| 2002/0046299 | A1* | 4/2002 | Lefeber et al. .............. 709/318 |
| 2002/0052885 | A1 | 5/2002 | Levy |
| 2002/0075312 | A1 | 6/2002 | Amadio et al. |
| 2002/0087649 | A1* | 7/2002 | Horvitz ...................... 709/207 |
| 2002/0087740 | A1* | 7/2002 | Castanho et al. ............ 709/318 |
| 2002/0091739 | A1 | 7/2002 | Ferlitsch et al. |
| 2002/0103998 | A1 | 8/2002 | DeBruine |
| 2002/0113821 | A1 | 8/2002 | Hrebejk et al. |
| 2002/0120757 | A1 | 8/2002 | Sutherland et al. |
| 2002/0129033 | A1 | 9/2002 | Hoxie et al. |
| 2002/0138552 | A1 | 9/2002 | DeBruine et al. |
| 2002/0138744 | A1 | 9/2002 | Schleicher et al. |
| 2002/0163572 | A1 | 11/2002 | Center et al. |
| 2002/0184357 | A1 | 12/2002 | Traversat et al. |
| 2002/0188605 | A1 | 12/2002 | Adya et al. |
| 2002/0188735 | A1 | 12/2002 | Needham et al. |
| 2002/0194252 | A1* | 12/2002 | Powers, III ................. 709/108 |
| 2002/0199061 | A1 | 12/2002 | Friedman et al. |
| 2003/0009484 | A1 | 1/2003 | Hamanaka et al. |
| 2003/0014415 | A1 | 1/2003 | Weiss et al. |
| 2003/0018712 | A1 | 1/2003 | Harrow et al. |
| 2003/0028610 | A1 | 2/2003 | Pearson |
| 2003/0041178 | A1* | 2/2003 | Brouk et al. ............... 709/313 |
| 2003/0046260 | A1 | 3/2003 | Satyanarayanan et al. |
| 2003/0069893 | A1 | 4/2003 | Kanai et al. |
| 2003/0078918 | A1 | 4/2003 | Souvignier et al. |
| 2003/0093580 | A1* | 5/2003 | Thomas et al. ............. 709/318 |
| 2003/0117403 | A1 | 6/2003 | Park et al. |
| 2003/0120928 | A1 | 6/2003 | Cato et al. |
| 2003/0120952 | A1 | 6/2003 | Tarbotton et al. |
| 2003/0158855 | A1 | 8/2003 | Farnham et al. |
| 2003/0184587 | A1 | 10/2003 | Ording et al. |
| 2003/0212680 | A1 | 11/2003 | Bates et al. |
| 2003/0222915 | A1 | 12/2003 | Marion et al. |
| 2003/0227487 | A1 | 12/2003 | Hugh |
| 2004/0003247 | A1 | 1/2004 | Fraser et al. |
| 2004/0008226 | A1 | 1/2004 | Manolis et al. |
| 2004/0019584 | A1 | 1/2004 | Greening et al. |
| 2004/0056896 | A1 | 3/2004 | Doblmayr et al. |
| 2004/0068524 | A1 | 4/2004 | Aboulhosn et al. |
| 2004/0083433 | A1 | 4/2004 | Takeya |
| 2004/0098379 | A1 | 5/2004 | Huang |
| 2004/0177116 | A1 | 9/2004 | McConn et al. |
| 2004/0177148 | A1 | 9/2004 | Tsimelzon, Jr. |
| 2004/0205698 | A1* | 10/2004 | Schliesmann et al. ....... 717/106 |
| 2005/0004928 | A1 | 1/2005 | Hamer et al. |
| 2005/0027757 | A1 | 2/2005 | Kiessig et al. |
| 2005/0097477 | A1 | 5/2005 | Camara et al. |
| 2005/0114672 | A1 | 5/2005 | Duncan et al. |
| 2005/0120242 | A1 | 6/2005 | Mayer et al. |
| 2005/0131903 | A1 | 6/2005 | Margolus et al. |
| 2005/0149481 | A1 | 7/2005 | Hesselink et al. |
| 2005/0166159 | A1 | 7/2005 | Mondry et al. |
| 2005/0171947 | A1 | 8/2005 | Gautestad |
| 2005/0192966 | A1 | 9/2005 | Hilbert et al. |
| 2005/0243993 | A1 | 11/2005 | McKinzie et al. |
| 2005/0246643 | A1 | 11/2005 | Gusmorino et al. |
| 2005/0256909 | A1 | 11/2005 | Aboulhosn et al. |
| 2006/0080308 | A1 | 4/2006 | Carpentier et al. |
| 2006/0129627 | A1 | 6/2006 | Phillips et al. |
| 2006/0173873 | A1 | 8/2006 | Prompt et al. |
| 2006/0200832 | A1* | 9/2006 | Dutton ...................... 719/318 |
| 2006/0218122 | A1 | 9/2006 | Poston et al. |

FOREIGN PATENT DOCUMENTS

| | | |
|---|---|---|
| WO | 00/36493 | 6/2000 |
| WO | 01/09755 | 2/2001 |
| WO | 01/69387 | 2/2001 |

OTHER PUBLICATIONS

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

Written Opinion of Singapore Application No. 200403220-7 dated May 18, 2006.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Wikipedia, File Allocation Table, 2006, <http://en.wikipedia.org/wiki/File_Allocation_Table>.

"About Managing Messages With Rules," Microsoft® Outlook® 2003 Help file, 3 pp.

"Trillian / Trillian Pro IM Clients" Product Description, © 1999-2004 Cerulean Studios, <http://www.ceruleanstudios.com> [retrieved Apr. 30, 2004].

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford Flash Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

International Search Report and Written Opinion of PCT/US04/25931 dated Apr. 3, 2007.

Kuchinsky, et al., "FotoFile: A Consumer Multimedia Organization and Retrieval System", May 1999, ACM, pp. 496-503.

Written Opinion of SG 200301764-7 dated Jan. 11, 2007.

Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

Bott, et al., Book titled "Special Edition Using Windows 98, Second Edition", Dec. 21, 1999, second edition, pp. 1-7.

Supplementary European Search Report for EP 04780390 dated Jun. 18, 2007.

* cited by examiner

EXTENSIBLE USER CONTEXT SYSTEM FOR DELIVERY OF NOTIFICATIONS

CROSS-REFERENCE(S) TO RELATED APPLICATION(S)

This application is related to U.S. application Ser. No. 10/402,179 titled "System and Method Utilizing Test Notifications," filed concurrently with the present application, which is hereby incorporated by reference in its entirety.

FIELD OF THE INVENTION

The present invention relates to notifications in computing systems, and more particularly, a system for controlling the delivery of notifications from multiple sources and in accordance with a user context.

BACKGROUND OF THE INVENTION

In computer systems, a notification may be in the form of a signal from a program that indicates to a user that a specified event has occurred. Such a notification may contain various elements of text, sound, and graphics. Other properties may also be included with the notification, such as priority, the person who sent the notification (for channels such as e-mail or instant messaging), and when the notification expires. Notifications may also include some elements of code such that the user can interact with the notification and launch arbitrary code (e.g., clicking on buttons or text within the notification that can cause new programs to launch or actions to be taken on programs that are currently running).

An operating system may create notifications to let a user know about network connectivity and updates. A instant messaging program that uses "contact lists" may draw notifications on the screen to let the user know what is happening with the contact list or when a contact initiates an instant message conversation. Other programs may provide similar notifications that draw in similar areas of the display. One issue with these types of notifications is that they aren't generally aware of the other notifications, thus sometimes leading to notifications being drawn on top of other notifications.

Another issue with existing notification systems is that they may cause notifications to be delivered inappropriately, or at inappropriate times. For example, for a user providing a full screen presentation, it may be inappropriate to have other programs draw notifications on the screen during the presentation. An example of a program that might draw such inappropriate notifications is a instant messaging program that runs in the background of the operating system and draws such notifications when contacts in the contact list sign on or initiate an instant message. This type of "interruption" during a presentation may be undesirable to a user.

The present invention is directed to providing a system that overcomes the foregoing and other disadvantages. More specifically, the present invention is directed to a system for controlling the delivery of notifications from multiple sources which takes into account the user context in determining the appropriate handling of each notification.

SUMMARY OF THE INVENTION

A system for controlling the delivery of notifications is provided. In accordance with one aspect of the invention, the system brokers and serializes the delivery of notifications from multiple sources. In addition, a shared notion of user context is provided, for determining the appropriate handling for each of the notifications. In accordance with these aspects, the notifications that are delivered by the system may be considered to be more valuable in that they are delivered when the user is more receptive to them. These aspects also provide for common rules which help the user to eliminate undesirable notifications.

In accordance with another aspect of the invention, user contexts are declared by the operating system and arbitrary programs. In one embodiment, a user context comprises a condition that may be true or false, and an instruction that is to be followed if the condition is true. For example, a condition might be "when a user is listening to music," for which the instruction might be "deliver notifications on the screen but with no sound." In general, the condition for the user context can be thought of as a state that the system assumes makes the user in some way unavailable for notification delivery or that causes the way that the notification should be delivered to be different from how it was sent by the program that initiated it. The user may be in a state deemed "unavailable" in which case the notification is either not delivered or held until the user becomes "available." For instance, if the user is running a full screen application, where the application is using or being displayed on the full area of a display screen, that user may be deemed unavailable. Or, the user may be "available" but in such a state that the notification needs to be modified to be appropriate for the user.

In accordance with another aspect of the invention, in addition to the operating system declaring contexts, programs register with the system and declare the context they provide and the impact it has on notifications (as per if drawing on the screen is appropriate and the level of invasiveness that is appropriate for drawing on the screen and whether or not sound is appropriate or at what relative volume sound should be played at) and then tells the system whether the context is true or false. In one embodiment, the context may also be evaluated as true or false at the time that a notification is to be delivered. In one embodiment, the system may also track the process of the calling program, and if the process is no longer present, the context may be reset to false. By tracking the process, certain undesirable situations can be avoided, such as an application declaring a user as being busy, and then crashing, and then leaving the user stuck in a state in which they have been declared as not being available for receiving notifications.

In accordance with another aspect of the invention, there may be different levels of invasiveness specified for the drawing of notifications. In other words, based on the user context, there may be gradients for the drawing of notifications, such that there may be different levels of invasiveness in the form of the drawn notification. For example, a normal notification may be free to be drawn in the client area and briefly obscure a window. If the user is in a slightly restrictive context, the notification may be free to show, but only in a less invasive manner, such as it might not be allowed to draw on top of another window. As another example, if a user is running a maximized application, the setting may be that the user context is slightly restricted, in that the user has clearly made a statement that they want their current application to get the entire client area. In this circumstance, notifications may still be allowed to draw, but they may be made to only appear within the sidebar. This type of reduced invasiveness in the notification drawing form lessens the impact of the notifications, and lessens the cognitive load.

In accordance with another aspect of the invention, the contexts that have been provided are exposed to the user and can either be turned off (e.g., the user doesn't agree with the program's assessment of the context) or changed in terms of the impact on delivery.

In accordance with another aspect of the invention, the user may define rules that dictate how notifications that contain specified elements should be delivered. For example, a user rule might dictate that any notifications received from "John Doe" and with "urgent" in the subject line, should be delivered immediately. In one embodiment, such user rules are given precedence over the user contexts. The user rules are made available to the user for modification in accordance with the user's preferences.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system for delivering notifications. In prior systems, there have typically been numerous competing elements which want to send notifications to a user, each of which designs its own way to send such notifications. None of the competing elements have generally been aware of the other notifications and thus have tended to draw on top of each other and each other's applications, which can lead to conflicts when each chooses to render an indication of their respective notifications at the same time. Additionally, there has been no shared notion of user context, leading to some notifications being delivered inappropriately, or at inappropriate times. The present invention addresses these issues by building notifications as a rich part of the operating system, such that the user interfaces for notifications provided by the invention become similar and thus stop conflicting with one another because the system appropriately brokers and serializes their on-screen rendering. In addition, the notifications provided by the invention can be considered to be more valuable because they are delivered when the user is more receptive to them, and in addition the use of common rules helps the user to eliminate undesired notifications.

Figure 1:
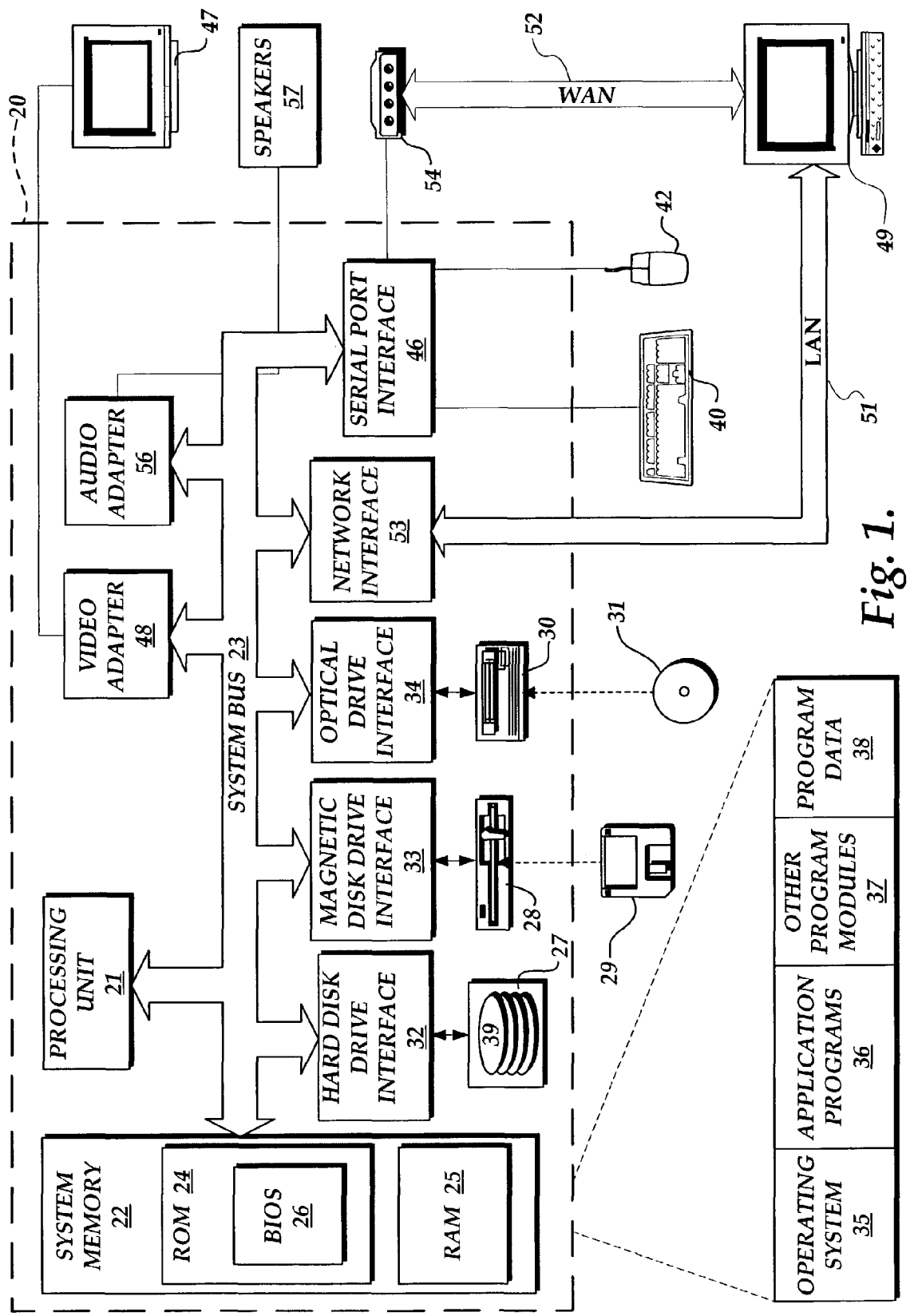
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

The present invention, implemented on a system of the type illustrated in FIG. 1, provides for the delivery of notifications to a user. More specifically, as will be better understood from the following description, the present invention provides for controlling the delivery of notifications from multiple sources and in accordance with a user context.

In one embodiment, a user context system in accordance with the present invention may consist of three elements that are compared for a decision as to how to process a notification. The first element is the user's context (as may be provided by the operating system and arbitrary programs that have extended it). The second element is the user's rules and preferences. The third element is the notification itself (which contains elements such as data and properties that may match the user's rules).

As will be described in more detail below, the invention operates by the operating system and other programs declaring a user's contexts, after which the system brokers the user's context and rules. Notifications are raised by other programs calling into the system. The user's context, rules, and elements of the notification are compared and then a determination is made as to what should be done with the notification. Examples of various options for what may be done with the notification include denying (if the notification is not allowed to draw or make noise, and the notification is to never be seen by the user), deferring (the notification is held until the user's context changes or the user's rules dictate that it is subsequently appropriate to deliver), delivering (the notification is allowed to be delivered in accordance with the user's context and rules), and routing (the user's rules indicate that the notification should be handed off to another system, regardless of whether the notification is also allowed to be delivered in the present system).

Various routines for delivering a notification are described in more detail below. In general, the user may be in a state deemed "unavailable" in which case the notification is either not delivered or held until the user becomes "available". For instance, if the user is running a full screen application, that user may be deemed unavailable. Or, the user may be "available" but in such a state that the notification needs to be modified to be appropriate for the user. For instance, if the user is listening to music or in a meeting, the user may have indicated that the notifications should be delivered to the user's screen but that the sound they make should be either quieter or not made at all.

As noted above, the user context determines in part whether notifications are shown on the user's screen. When a notification is shown, it may be shown based on certain gradients within the user context. In other words, there are different levels of invasiveness of the form of the drawn notification that may be specified. For example, a normal notification is free to pop out into the client area and briefly obscure a window. If the user is in a slightly restrictive context, the notification may be free to show, but only in a less invasive manner, such as it might not be allowed to draw on top of another window. As another example, in one embodiment where the user is running a maximized application, the default setting may be that this means that context is slightly restricted, and that the user has clearly made a statement that they want this application to get the entire client area. In this setting, a notification may still be allowed to draw, but may be made to only appear within the sidebar. In other words, this type of reduced invasiveness in the notification drawing form lessens the impact of the notification, and overall lessens the cognitive load.

Figure 2:
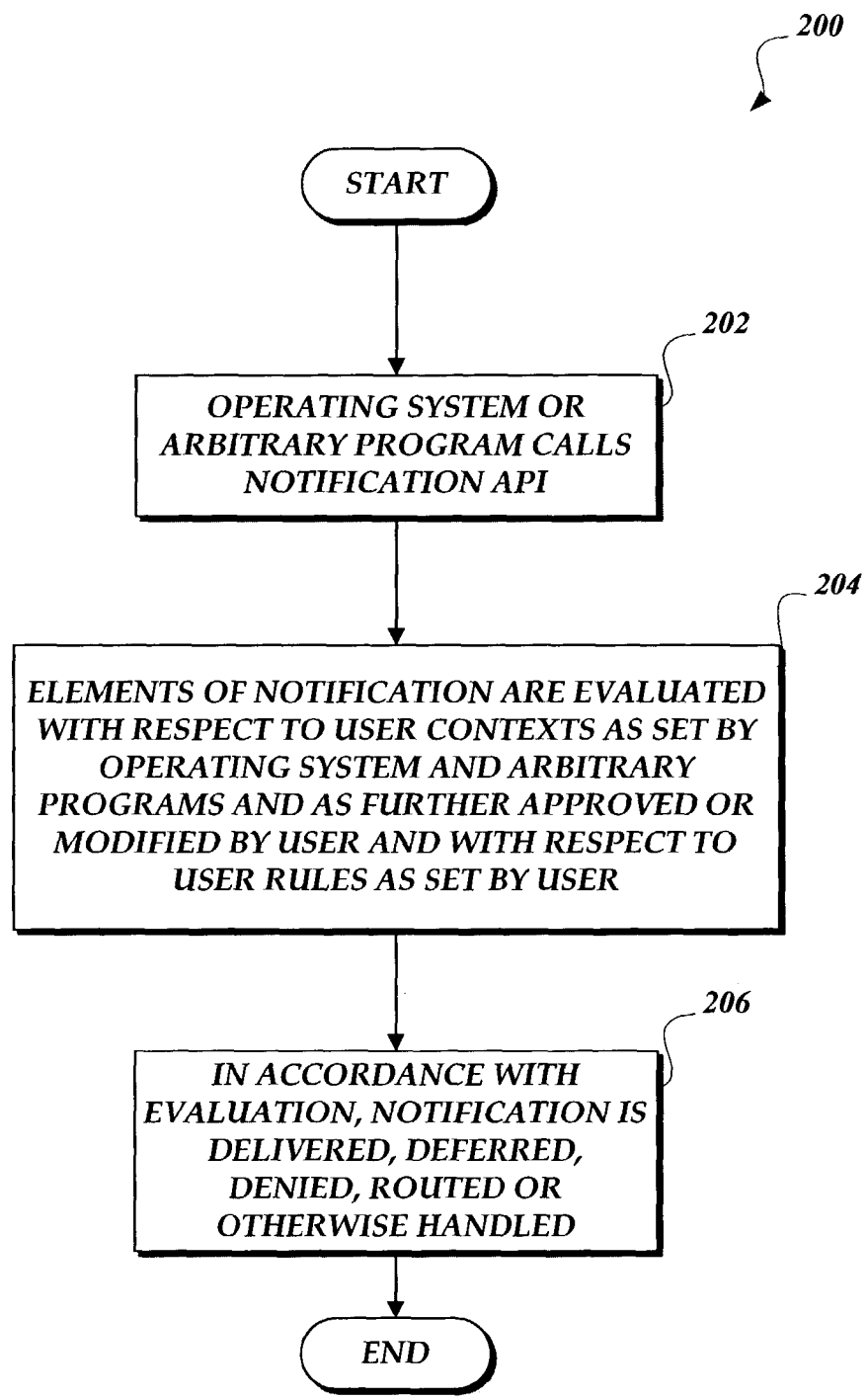
FIG. 2 is a flow diagram illustrative of a general routine for processing a notification in accordance with the present invention.

FIG. 2 is a flow diagram illustrative of a routine 200 for processing a notification in accordance with the present invention. At a block 202, the operating system or an arbitrary program calls a notification application programming interface (API). At a block 204, the elements of the notification are evaluated with respect to user contexts as set by the operating system and arbitrary programs, and as further approved or modified by the user, and with respect to user rules as set by the user. At a block 206, a notification is delivered, deferred, denied, routed, or otherwise handled in accordance with the user contexts and user rules.

The user contexts and user rules will be described in more detail below. In one embodiment, a user context consists of a condition that may be either true or false, and an instruction for determining how a notification should be handled when the condition is true. In general, the condition of a user context can be thought of as a state that the system assumes makes the user in some way unavailable for notification delivery or that causes the way that the notification is delivered to be different from how it was sent by the program that initiated it. In other words, in one embodiment a user context can be thought of as a statement that "while condition X is true, then this is what should be done with incoming notifications." An example would be "when my music player is playing music for me, incoming notifications should show on the screen but not play sound." Another example would be "while any application is running in full screen mode, incoming notifications should be deferred until later."

With respect to such user contexts, in one embodiment a user may also define special rules for handling incoming notifications, and thus may provide for special exceptions to the instructions of the user contexts. As an example, a user rule might state "when I receive a new e-mail from 'John Doe,' and with 'urgent' in the text, and marked 'high priority,' deliver the e-mail regardless of other user contexts." In other words, in this example this user rule provides an exception to a user context which would otherwise indicate that it is inappropriate to deliver a notification for an incoming e-mail at this time. With regard to the elements of the notification that the user rules are evaluated with respect to, these may include things like text, sound, graphics, and other properties such as priority, the person who sent the notification (for channels such as email or instant messaging), when the notification expires, and some elements of code such that the user can interact with the notification and launch arbitrary code (e.g., clicking on buttons or text within the notification can cause new programs to launch or actions to be taken [such as deleting email] on programs that are currently running).

Figure 3:
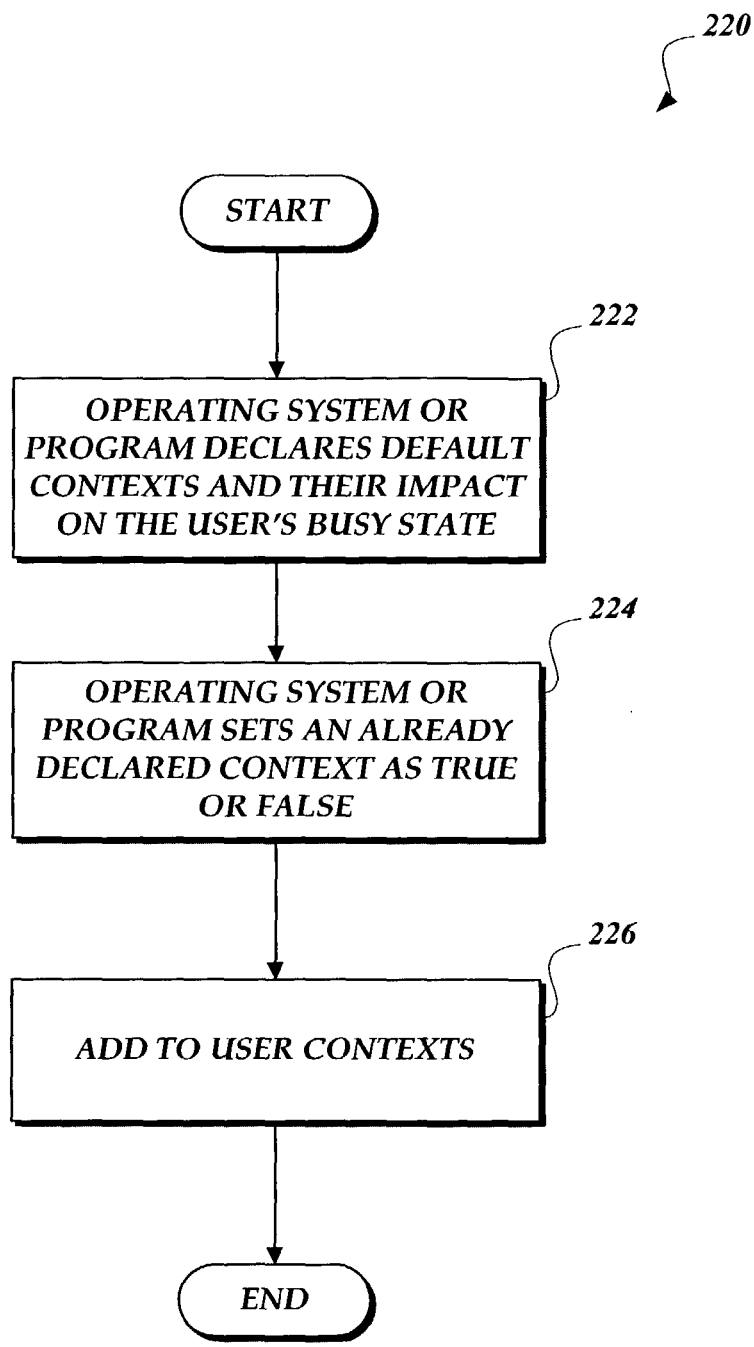
FIG. 3 is a flow diagram illustrative of a routine for an operating system or arbitrary program declaring user contexts.

FIG. 3 is a flow diagram illustrative of a routine 220 for an operating system or arbitrary program declaring user contexts. At a block 222, the operating system or program declares the default contexts and their impact on the user's busy state. In other words, programs register with the system and provide user contexts including the impact they have on the notifications (e.g., if drawing on the screen is appropriate and whether or not sound is appropriate or at what relative volume sound should be played). As an example, a music player program may declare a default context that states "when the music player is playing music for the user, incoming notifications should show on the screen but not play sound." As another example, the operating system might declare a context which states "while any application is running in full screen mode, incoming notifications should be deferred until a later time."

Returning to FIG. 3, at a block 224, the operating system or program sets the declared context as true or false. For example, with regard to the music player declaring the context of "when the music player is playing music, incoming notifications should show on the screen but not play sound," the music player program also sets this declared context as currently being true or false. In other words, the music player program indicates whether it is true or false that the music player is currently playing music. As will be described in more detail below, in one embodiment, the determination of whether a context is true or false may also be evaluated at the time the notification API is called, or at the time the user rules and exceptions are re-evaluated. As an additional feature, the system may also track the process handle of the calling program, such that if the process terminates without first resetting the context value to its default 'false' value, the system will reset the context value as soon as it detects that the initial process does not exist any more (in one embodiment, the process handle state is set to signal when the process terminates, and that state change is picked up by the system which watches the process handle). This ensures that if processes terminate unexpectedly or forget to reset the context, then the delivery of further notifications will not be unduly affected. For example, if in the above example the music player program has been closed and the process is no longer present, then the context may automatically be reset to false. As another example, if a program originally declares a user as being busy, but then the program crashes, such that the process is no longer present, the context may automatically be set to false rather than leaving the user stuck in a state where notifications would not be received. In any event, whether or not a context is actively set or is evaluated as a function, in one embodiment the contexts can generally be resolved to be either true or false.

Returning to FIG. 3, at a block 226, the context information is added to the user contexts that are stored in the system. This process is repeated by additional programs declaring contexts. In addition, as noted above, the state of whether already declared contexts are true or false will change over time as the user opens and closes different programs and undertakes different tasks.

As noted above, in one embodiment registering a context is a declarative process. As will be described in more detail below, in accordance with one aspect of the invention, by registering the user contexts, the user can be presented with a list of the contexts so that the user can choose to not accept certain contexts or to change what they mean if the user disagrees with the context parameters. As noted above, in one embodiment, a context may consist of a condition that may be true or false, and an instruction for what to do with notifications when the condition is true. In this regard, a user context may comprise specific programming elements, such as: a human readable string (for the end user to know what is meant); a unique identifier (such as a globally unique identifier, aka GUID) so that the program can tell the operating system when this context is true or not; and the instruction which may comprise a statement of what this context means in terms of notifications drawing on screen (as may include invasiveness level, sound, and volume). A context may also be dynamic, as will be described in more detail below.

Figure 4:
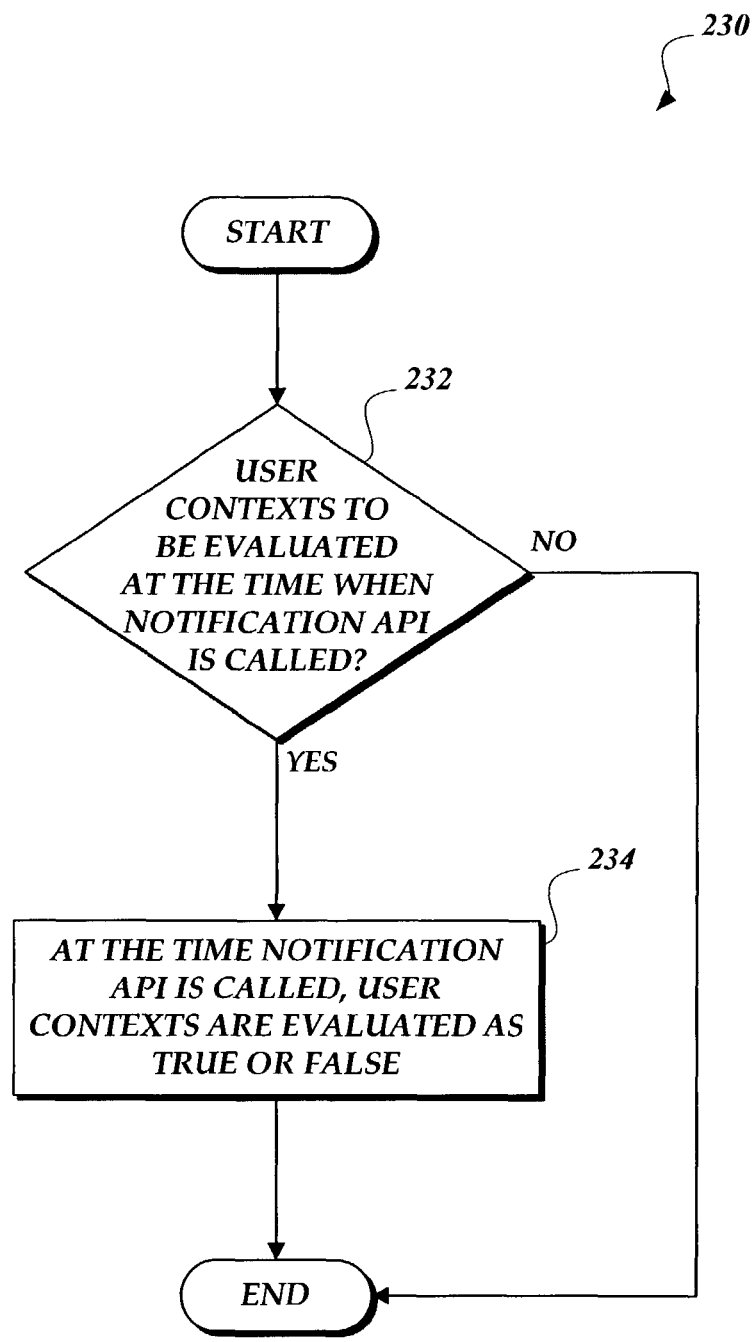
FIG. 4 is a flow diagram illustrative of a routine for evaluating user contexts as true or false at the time a notification API is called.

FIG. 4 is a flow diagram illustrative of a routine 230 for a context to be evaluated as true or false at the time the notification API is called. At a decision block 232, a determination is made whether the user contexts are to be evaluated at the time when the notification API is called. If the user contexts are to be evaluated, then the routine proceeds to block 234. If the user contexts are not to be evaluated at the time when the notification API is called, then the routine ends. At block 234, the user contexts are evaluated as true or false.

As illustrated by FIGS. 3 and 4 and as noted above, a context may be proactively set or it may be a function that is evaluated at a relevant time. As an example, a program may actively note that a user is listening to music. As another example, when a notification is evaluated, the program may have registered its callback such that the program is queried by the system at the time the notification is evaluated whether the context is true. One example of a case where this second process can be particularly important is when a user context is combined with a user rule to form a dynamic context. (User rules will be described in more detail below.) A specific example of a user context combined with a user rule would be when a user has set a rule that states "people who I'm meeting with right now can always send me notifications irrespective of my busy state." In this case, the user context of "when the user is in a meeting," must further be evaluated in terms of who the user is in the meeting with. In this example, the program that handles the meetings may register this as a dynamic context, and when a notification is evaluated, the person who sent the notification is evaluated against this context (which otherwise could not be declared as true or false proactively, since the people attending the meeting may change over time). In other words, this particular example requires evaluation of a user's context in light of a user rule that depends on other people's contexts.

Figure 5:
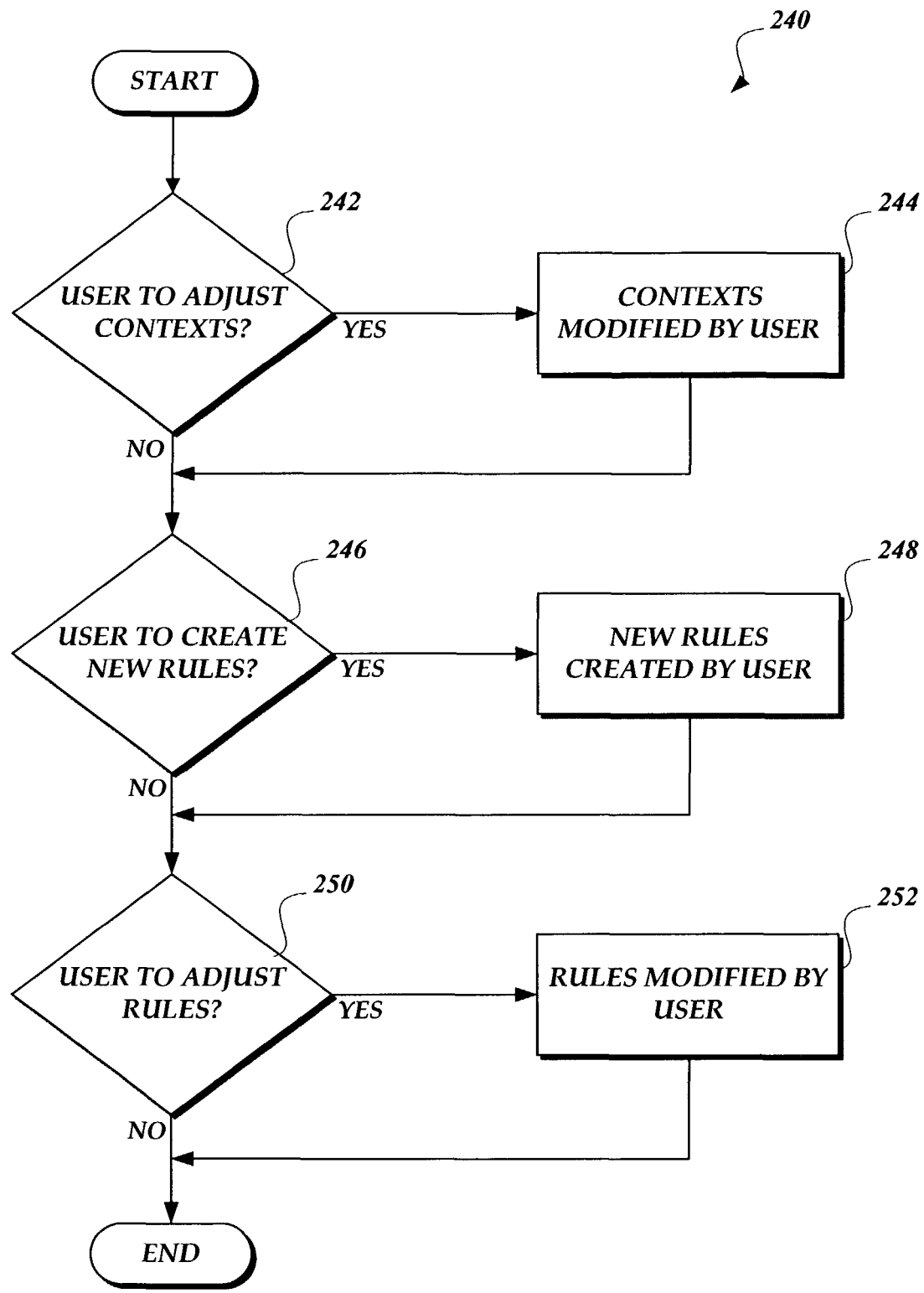
FIG. 5 is a flow diagram illustrative of a routine for adjusting user contexts and creating new user rules.

FIG. 5 is a flow diagram illustrative of a routine 240 by which a user may adjust contexts and create new rules. At a block 242, a determination is made whether the user wishes to adjust the contexts. If the user does not wish to adjust the contexts, then the routine proceeds to a decision block 246, as will be described in more detail below. If the user does wish to adjust the context, then the routine proceeds to a block 244, where the user makes modifications to the contexts.

In one embodiment, the contexts that have been provided may be exposed to a user in a manner which allows the user to either turn the contexts off (e.g., the user doesn't agree with the program's assessment of the context), or to change the context in terms of the impact on delivery of a notification. As more specific examples, user contexts can include things like "while any application is running in full screen mode"; "when I'm playing music or video"; "when my meeting manager shows me in a meeting"; or "when my out of office assistant is turned on." For each of these, the user could be allowed to make selections that specify an instruction that when the given condition is true, the incoming notifications should follow selected procedures. The instructions can specify things like whether or how the notification will draw on the screen, and the sound or volume that the notification will make. For the volume, the user can specify a percentage of desired volume under the given condition. For the options for drawing the notification on the screen, the user can be provided with options such as not drawing the notification at all, or drawing the notification only on a specified external display, or drawing the notification on the present screen. For the drawing of a notification, different levels of invasiveness can be specified. For example, if a user is running a maximized application, such that the context is slightly restricted, the invasiveness setting might be such that notifications can still draw, but might appear only within a sidebar.

Returning to FIG. 5, at decision block 246, a determination is made whether the user wishes to create new user rules. If the user does not wish to create new user rules, then the routine proceeds to a decision block 250, as will be described in more detail below. If the user does wish to create new user rules, then the routine proceeds to a block 248, where new rules are created. In general, user rules dictate how notifications that contain specified elements should be handled. For example, a rule may dictate that notifications from a specified person should always be delivered immediately, and this rule can be applied to all notifications, irrespective of which program initiated the notification as long as it is from the specified person. As more specific examples, other user rules may be directed to things like "MSN auto's traffic alerts for Bremerton, Washington" and "important e-mails from John Doe." As an example of a user rule for an important e-mail from John Doe, the rule could dictate that any e-mails that arrive from John Doe, and with "urgent" in the text, and marked "high priority," should follow specified handling conditions. The handling conditions could specify that the notification should be delivered immediately and that the user should be required to acknowledge it. In general, requiring a user to acknowledge a notification means that there is a slightly raised elevation in the form of the notification's invasiveness, in that the notification will stay on-screen until the user specifically dismisses it. In one embodiment, the requiring of a user's acknowledgement is only settable via a user rule. As another example, the rules could also specify a custom sound to be played for the notification, at a specified volume, so as to provide an alert to the user that a special notification has arrived. Different settings may also be selected for how the notification should be handled during "normal" and "busy" conditions for the user, as may be determined by the user's context. The handling instructions may also include things like routing options for the notification, such as "deliver notifications from John Doe to my pager." In one embodiment, when the context is evaluated, the most restrictive currently true context is the one that is applied. When user rules are evaluated, it means that a particular notification has matched the rule that the user has created, in which case the most invasive setting is applied from the user rules which have matched the notification. In other words, in the user rules, a user has specified something to be of importance, and this procedure is intended to follow the user's preferences. If there is a conflict between two rules, the most invasive is applied.

In one embodiment, the user rules may also be directed to controlling the delivery of notifications from specific notification services. For example, an operating system that provides notifications in accordance with a notification service may provide the user with a way to modify how the notifications are delivered. For example, the specified notification service may provide "traffic alerts for Seattle", and the user may edit the delivery to be such that when such notifications are received the system should "show the notification and play sound."

Returning to FIG. 5, at decision block 250, a determination is made whether the user wishes to adjust any of the already existing user rules. If the user does not wish to adjust any of the rules, then the routine ends. If the user does wish to adjust the user rules, then the routine proceeds to a block 252, where the user makes modifications to the rules.

As described above with respect to FIGS. 3-5, the user contexts and user rules are set by the operating system, programs, and the user. The system appropriately brokers and serializes the delivery of the notifications in accordance with the user's preferences. The user contexts and user rules may be exposed to the user such that the user can modify or adjust the various contexts and rules, or create new rules. This provides the user with a centralized way to manage preferences for how notifications are handled. It will be appreciated that this allows a user to effectively manage the many competing elements in a computing system that may want to send notifications to the user.

Figure 6:
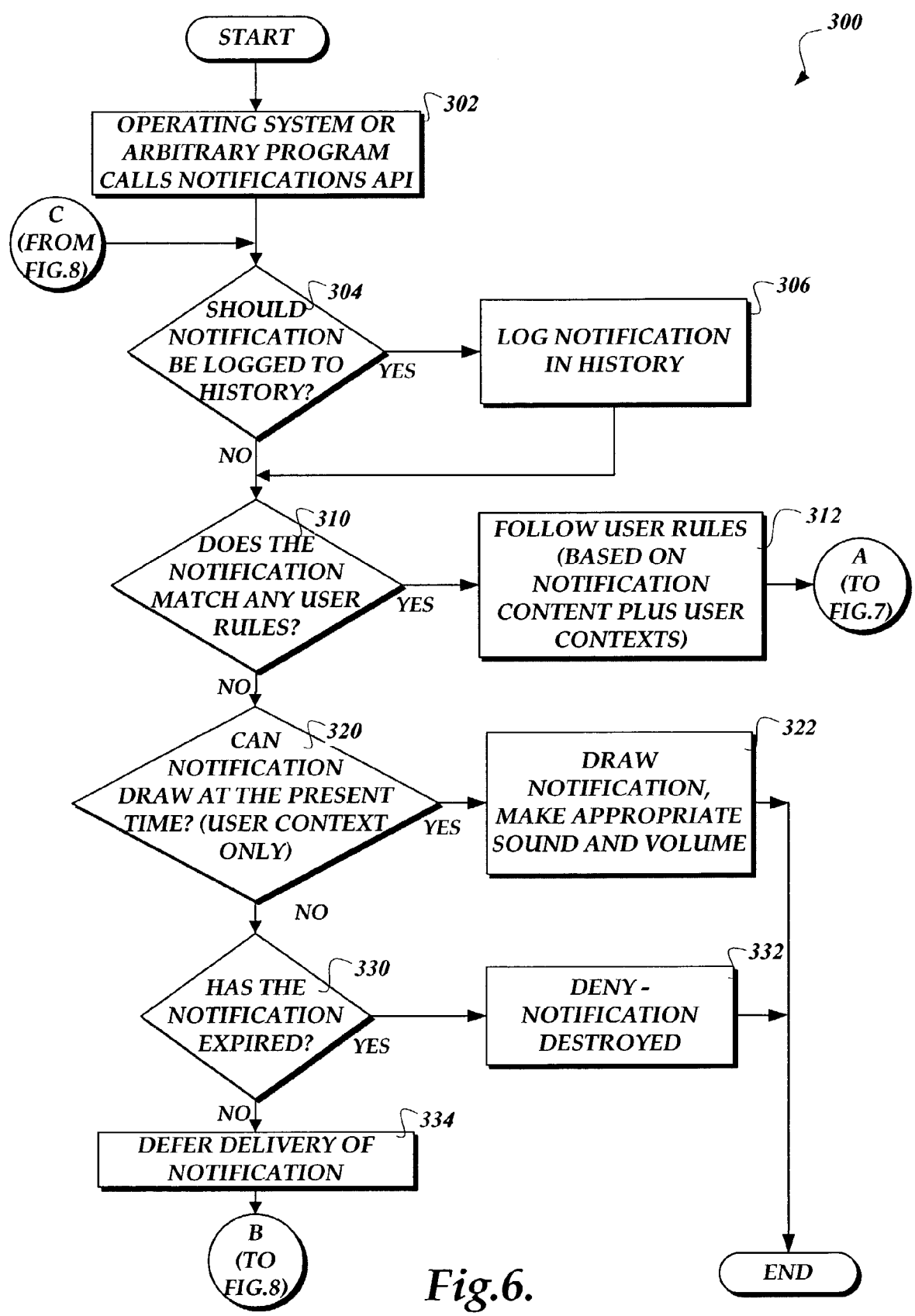
FIG. 6 is a flow diagram illustrative of a routine for processing a notification in accordance with user contexts and user rules.

FIG. 6 is a flow diagram illustrative of a routine 300 for processing a notification in accordance with user contexts and user rules. At a block 302, the operating system or an arbitrary program calls the notifications API. At a decision block 304, a determination is made whether the notification should be logged to the notification history. If the notification is to be logged, then the routine proceeds to a block 306, where the notification is logged to the history. If the notification is not to be logged, then the routine proceeds to a decision block 310.

At decision block 310, a determination is made whether the notification matches any user rules. If the notification matches any user rules, then the routine proceeds to a block 312, where the user rules are followed (based on the notification content plus the user contexts), and the routine continues to a point A that is continued in FIG. 7. If at decision block 310 the notification does not match any user rules, then the routine continues to a decision block 320.

In one embodiment, user rules always outweigh the current user contexts. As noted above, user rules can be based on any element of the notification. For example, a rule that is based on an evaluation of the person who initiated the notification, can be applied to all notifications, irrespective of which program initiated the notification as long as it is from the person on which the rule is based (e.g., "John Doe" can always reach me). In addition, notifications may draw on the screen even during contexts that would otherwise cause it not to draw (e.g., "people who are in a meeting with me can always send me notifications", even though the user context generally states that the user is not to receive notifications during a meeting).

Returning to FIG. 6, at decision block 320, a determination is made whether the notification can draw at the present time (based on the user context only). If the notification can draw at the present time, then the routine continues to a block 322, where the notification is drawn, and appropriate sound and volume are provided. If it is not appropriate to draw the notification at the present time, then the routine proceeds to a decision block 330.

At the decision block 330, a determination is made whether the notification has expired. If the notification has expired, then the routine proceeds to a block 332, where the notification is destroyed. If the notification has not expired, then the routine proceeds to a block 334, where the notification is deferred, and the routine continues to a point B that is continued in FIG. 7.

Figure 7:
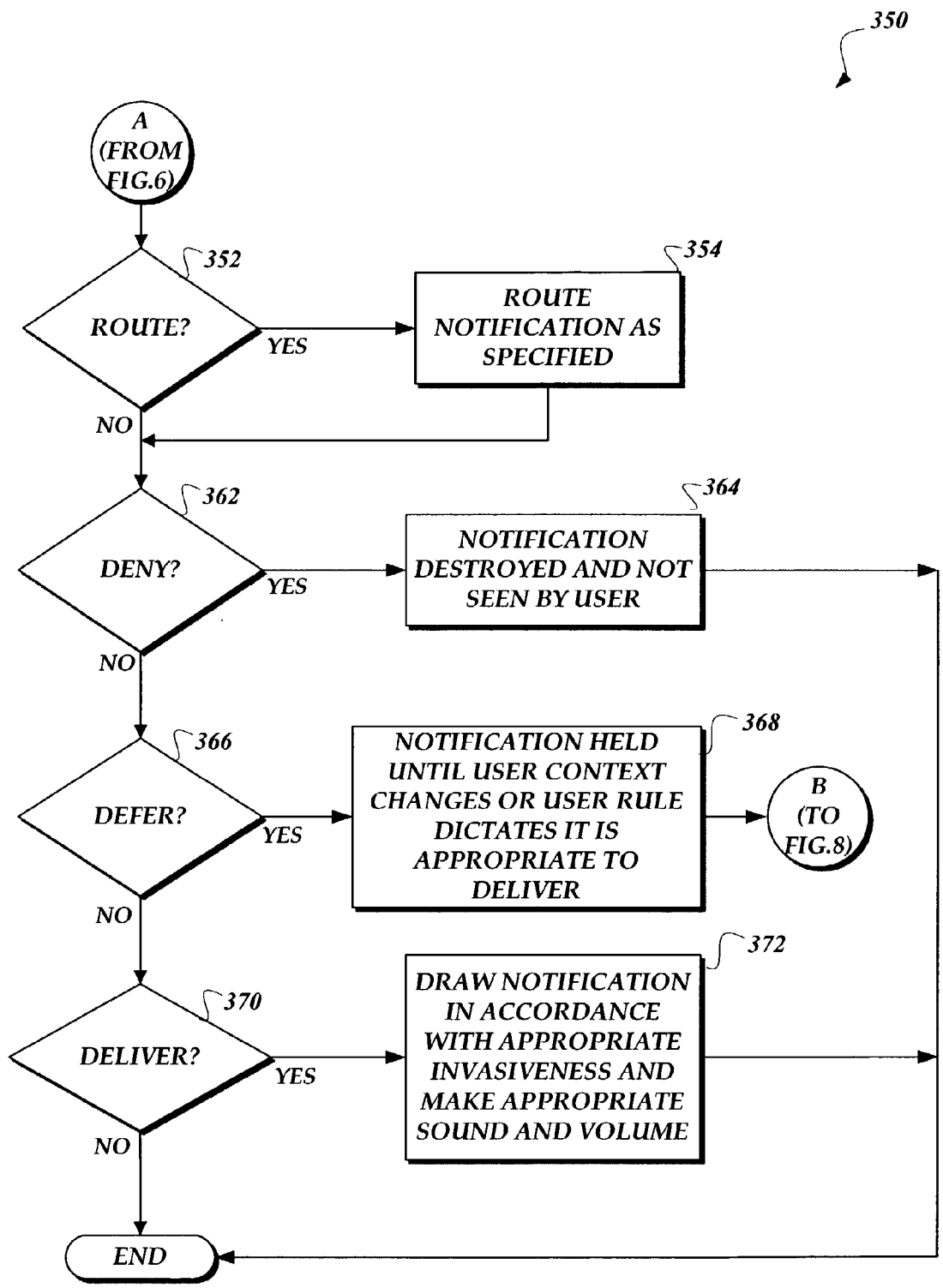
FIG. 7 is a flow diagram illustrative of a routine for implementing user rules based on a notification's content and the user contexts.

FIG. 7 is a flow diagram illustrative of a routine 350 for processing a notification in accordance with specified user rules. The routine is continued from a point A from FIG. 6, as described above. As illustrated in FIG. 7, at a decision block 352, a determination is made whether the notification should be routed. If the notification is not to be routed, then the routine continues to a decision block 362, as will be described in more detail below. If the notification is to be routed, then the routine proceeds to a block 354, where the notification is routed as specified. When a notification is routed, it indicates that the notification contains elements that match the user's rules that require the notification to be handed off to another system. This may happen if the user is busy, or it may happen on every notification that matches the criteria specified in the user's rules, whether or not the user is unavailable. As an example, a notification with the word "urgent" in it might always be forwarded to the user's pager, whereas other notifications might only be routed based on a combination of the user's rules and context.

Some examples of routing instructions include: "Forward this notification to an e-mail address"; "forward this notification to another PC"; "forward this notification to a pager"; "forward this notification to a cell phone"; or "forward this notification to an e-mail server." As will be described in more detail below, if the notification is routed, it may also be delivered and draw on the screen. In addition, the device to which the notification is forwarded may have this same context system implemented, and on that device there may be additional or different knowledge of the user's context, and the context system on that device may choose to do different actions with the notification.

Returning to FIG. 7, at decision block 362, a determination is made whether to deny the notification. If the notification is not to be denied, then the routine continues to a decision block 366, as will be described in more detail below. If the notification is to be denied, then the routine proceeds to a block 364 where the notification is destroyed and not seen by the user. In other words, a notification that is denied is not allowed to draw or make noise. For example, this may occur based on a user rule that states that a certain notification should be denied, or as described above with reference to block 332 of FIG. 6, when a notification has expired.

Returning to FIG. 7, at decision block 366, a determination is made whether the notification should be deferred. If the notification is not to be deferred, then the routine proceeds to a decision block 370, as will be described in more detail below. If the notification is to be deferred, then the routine proceeds to a block 368, where the notification is held until a user context changes, and the routine continues to a point B that is continued in FIG. 8. In general, deferring a notification indicates that the notification will be allowed to be delivered, but that the user's current context or rules are such that it is deemed inappropriate to deliver the notification at this time. As will be described in more detail below with reference to FIG. 8, once the user's context changes or alternatively when the user's rules indicate that it is subsequently appropriate, the notification will be delivered to the user's screen and allowed to draw and/or make its sound, as dictated by the user rules and user context.

Returning to FIG. 7, at decision block 370, a determination is made whether the notification should be delivered. If the notification is not to be delivered, then the routine ends. If the notification is to be delivered, then the routine proceeds to a block 372, where the notification is drawn in accordance with the appropriate level of invasiveness, and the appropriate sound and volume are provided. In other words, the notification is allowed to be delivered, though it is delivered in accordance with the user's context and rules (e.g., a notification may be allowed to be drawn but required to be silent).

Figure 8:
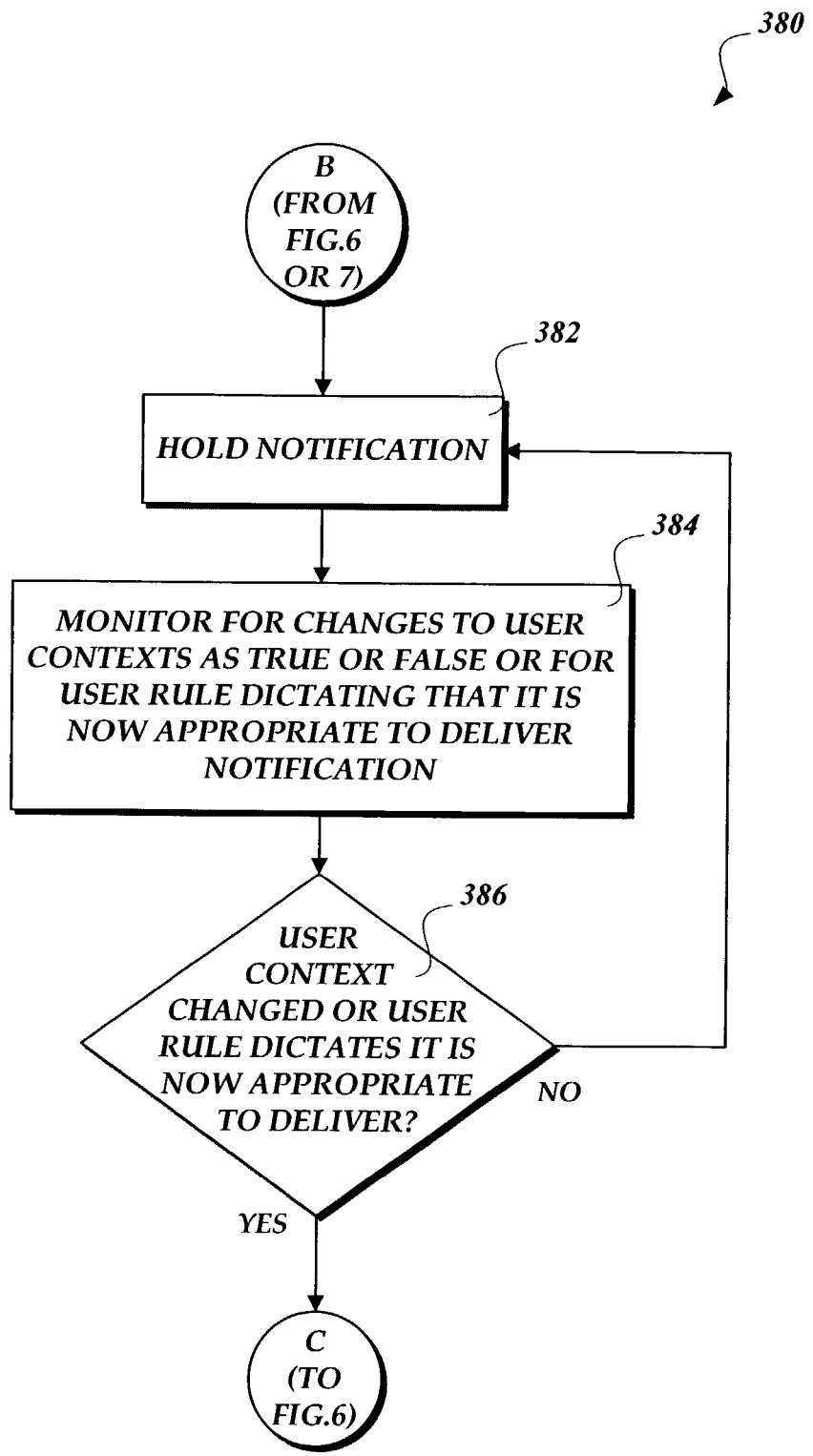
FIG. 8 is a flow diagram illustrative of a routine for deferring the delivery of a notification.

FIG. 8 is a flow diagram illustrative of a routine 380 for deferring the delivery of a notification. The routine is continued from a point B from either FIG. 6 or 7, as described above. As illustrated in FIG. 8, at a block 382, the notification is held. At a block 384, the system monitors for changes to the declared contexts as being true or false, or for a user rule dictating that it is now appropriate to deliver the notification. At a decision block 386, a determination is made whether a user context has changed, or a user rule dictates that it is now appropriate to deliver the notification. If a user context has not changed and if no user rule otherwise dictates, then the routine returns to block 382, where the notification continues to be held. If the user context has changed or if a user rule dictates that it may now be appropriate to deliver the notification, then the routine proceeds to a point C which is continued in FIG. 6. Point C in FIG. 6 returns to the decision block 304, where the process for evaluating the notification starts over.

Figure 9:
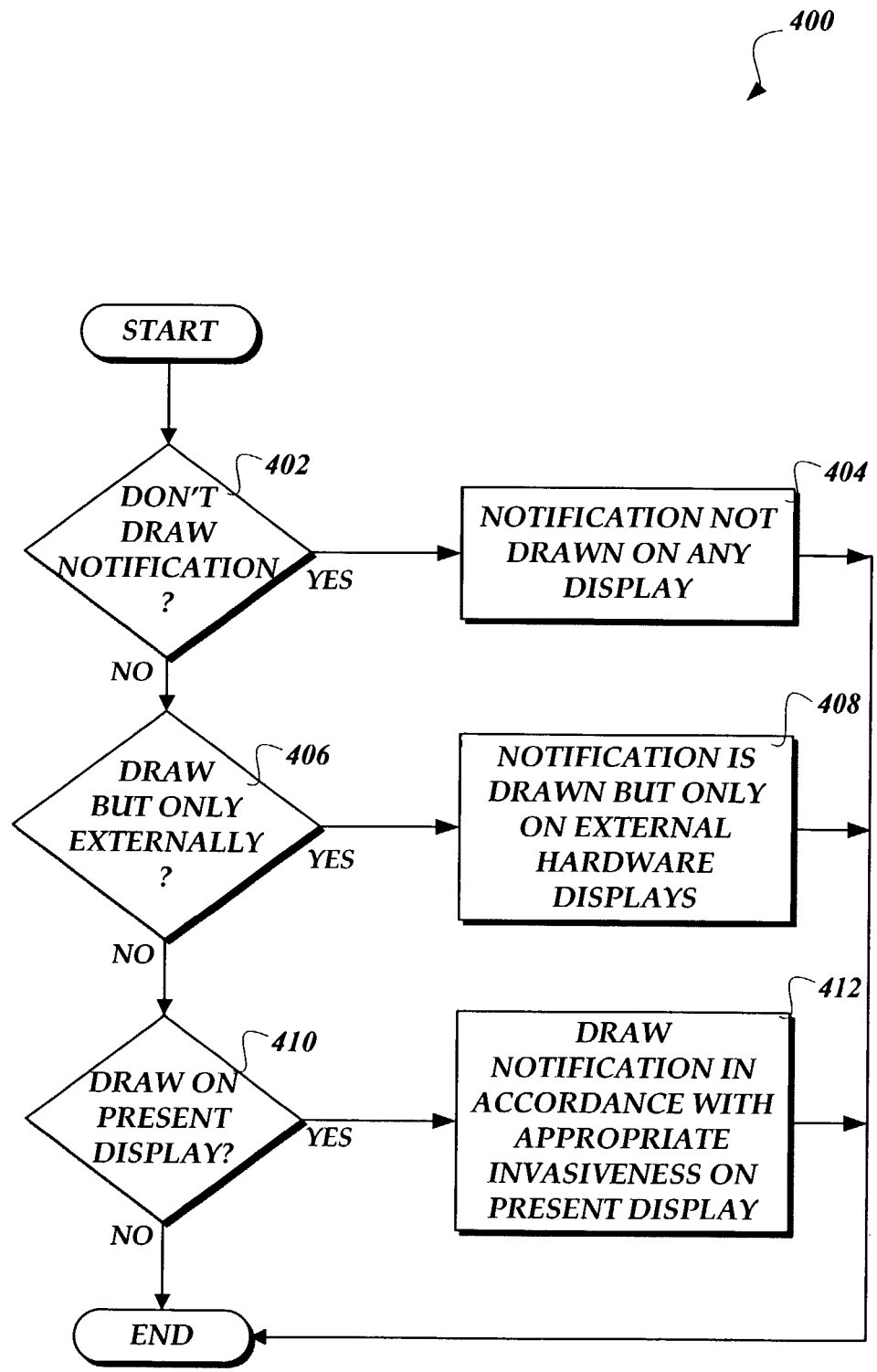
FIG. 9 is a flow diagram illustrative of a routine for determining how a notification will be drawn in accordance with various restrictive settings.

FIG. 9 is a flow diagram illustrative of a routine 400 for determining the drawing of a notification in accordance with various restrictions. It will be appreciated that this routine may be implemented as part of the processing of notifications, such as at block 322 of FIG. 6 or block 372 of FIG. 7. In general, when a notification enters the system, an evaluation is made of all of the contexts that are currently true, and the most restrictive settings for the notification are applied in accordance with the user's current state. As illustrated in FIG. 9, at a decision block 402, a determination is made whether the notification should not be drawn at all. If the notification is not to be drawn at all, then the routine proceeds to a block 404, where the notification is set to not be drawn on any display. If the notification is to be drawn, then the routine proceeds to a decision block 406.

At decision block 406, a determination is made whether the notification should be drawn but only externally. If the notification is only to be drawn externally, then the routine proceeds to a block 408, where the notification is drawn but only on external hardware displays. If the notification is not to be drawn on external hardware displays, then the routine proceeds to a decision block 410.

At decision block 410, a determination is made whether the notification should be drawn on the present display. If the notification is to be drawn on the present display, then the routine proceeds to a block 412, where the notification is drawn in accordance with the appropriate level of invasiveness on the present display. If the notification is not to be drawn on the present display, then the routine ends.

Figure 10:
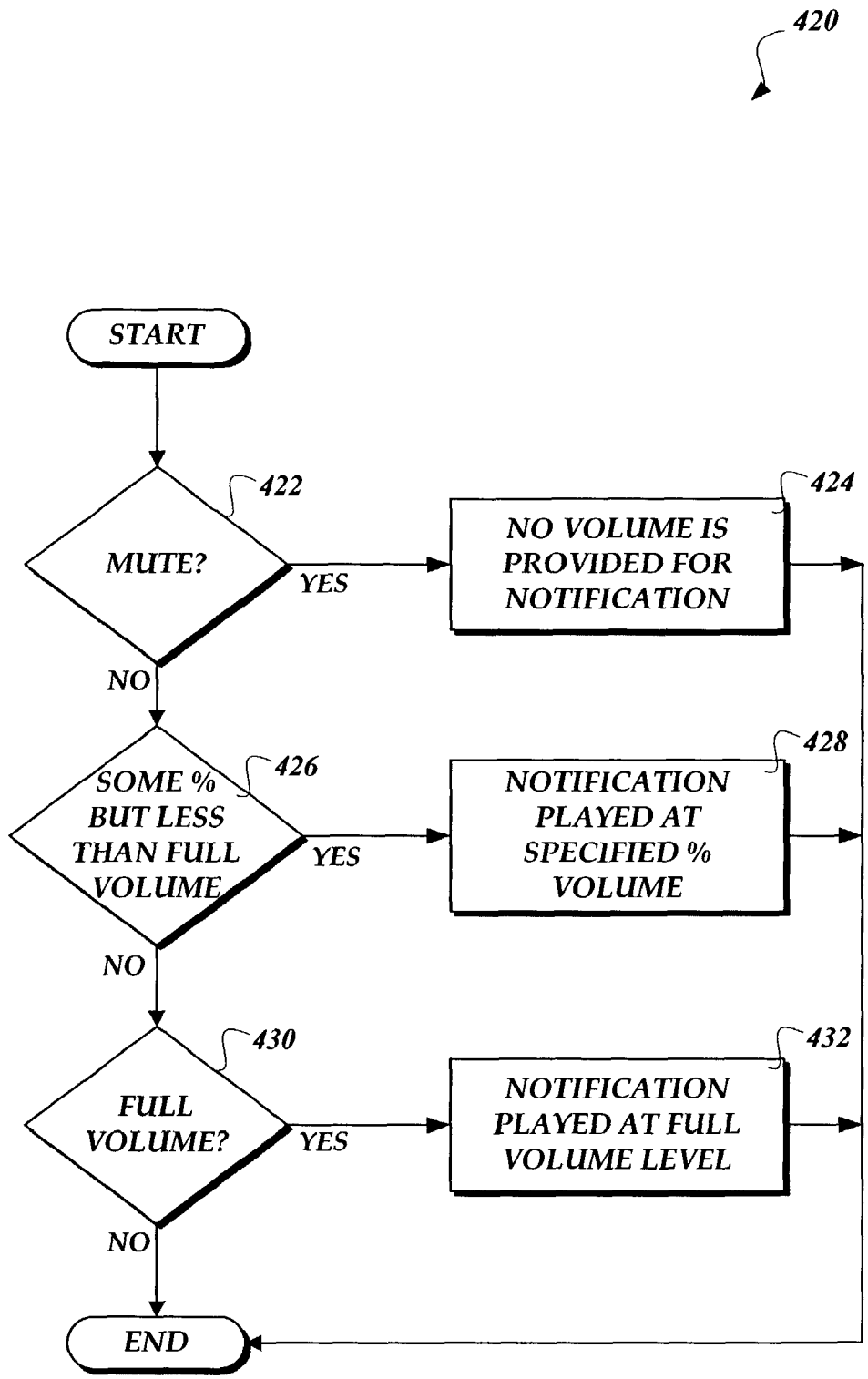
FIG. 10 is a flow diagram illustrative of a routine for determining a volume level for a notification in accordance with various restrictive settings.

FIG. 10 is a flow diagram illustrative of a routine 420 for determining the volume that will be played for the sound of a notification, in accordance with various restrictions. As was described above with respect to FIG. 9, it will be appreciated that this routine may be implemented as part of the processing of notifications, such as at block 322 of FIG. 6 or block 372 of FIG. 7. When the notification enters the system, an evaluation is made of all the contexts that are currently true, and the most restrictive settings are applied to the notification in accordance with the user's current state. As illustrated in FIG. 10, at decision block 422, a determination is made whether the notification should be muted. If the notification is to be muted, then the routine proceeds to a block 424, where no volume is provided for the notification. If the notification is not to be muted, then the routine proceeds to a decision block 426.

At decision block 426, a determination is made whether the notification should be provided with some percentage but less than full volume. If some percentage volume is to be provided, then the routine proceeds to a block 428, where the notification is played at the specified percentage volume. If a specified percentage volume is not to be provided, then the routine proceeds to a decision block 430.

At decision block 430, a determination is made whether full volume should be provided for the notification. If full volume is to be provided, then the routine proceeds to a block 432, where the notification is played at the full volume level. If full volume is not to be provided, the routine ends. In one embodiment, in addition to providing for different volume levels for the notification, different sounds may also be selected for the notification in accordance with the user context and rules.

It will be appreciated that the present invention as described above with respect to FIGS. 1-10, controls the delivery of notifications from various sources such that the notifications stop conflicting with one another because the system appropriately brokers and serializes their on-screen rendering. In addition, the notifications provided by the invention can be considered to be more valuable because they are delivered when the user is more receptive to them, and in addition the use of common rules helps the user to eliminate undesired notifications.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-readable storage medium having computer-executable components for implementing a method for controlling a delivery of notifications on a personal computing device, comprising:
    declaring a plurality of user contexts including at least a first user context, a user context comprising a condition that is true or false and an instruction that is to be followed if the condition is true wherein the condition is derived from one or more applications executing on the personal computing device;
    defining a first rule that, in combination with the first user context, forms a dynamic context that specifies how to deliver a notification containing a first specified element when the first user context is true, wherein the first specified element is a variable value defined by a value within a current user context;
    defining a second rule that dictates how to control the delivery of notifications that contain at least a second specified element;
    receiving notifications from a plurality of sources wherein the plurality of sources includes the one or more applications, the notifications including a first notification containing a first specified element and a second notification containing a second specified element;
    delivering the second notification in accordance with the second rule, without consideration of the plurality of user contexts;
    determining that the first user context applies to the first notification; and
    delivering the first notification according to the dynamic context.

2. The method of claim 1, wherein the instruction comprises at least one of routing, denying, deferring, or delivering a notification.

3. The method of claim 1, wherein the instruction is made available to the user for modification in accordance with the preferences of the user.

4. The method of claim 1, wherein at least one of the plurality of user contexts is declared by an operating system.

5. The method of claim 1, wherein at least one of the plurality of user contexts is declared by a source other than an operating system.

6. The method of claim 5, wherein the source other than the operating system is a computer software program.

7. The method of claim 1, wherein a plurality of the user rules are declared by the user.

8. The method of claim 7, wherein the user contexts and the user rules are made available to the user for modification in accordance with the preferences of the user.

9. In a system for controlling a delivery of notifications, comprising:
    means for declaring one or more user contexts, each context including a condition that can be in at least a first state or a second state and an instruction that is to be followed if the condition is true, wherein at least one condition is derived from one or more applications executing on the system;
    means for providing one or more rules to be used to modify how to deliver notifications when one or more notifications contain at least a specified element from a second group of specified elements corresponding to a plurality of rules, wherein the notifications are received by a personal computing device having the one or more applications executing thereon;
    means for defining a dynamic context based on a combination of a first rule and a first user context, the dynamic context specifying how to deliver a notification containing a specified element from a first group of specified elements when the first user context is true, wherein the first group of specified elements are variable values based on a user context of a second user;
    means for determining user preferences, the means comprising generating a user interface, inquiring to a user for input, receiving input, and modifying user preferences accordingly;
    means for receiving the notifications from the plurality of sources;
    means for controlling the delivery of notifications in accordance with the one or more rules prior to evaluation of the one or more user contexts when one or more notifications contain specified elements corresponding to a plurality of rules, and using a most invasive rule of the plurality of rules to modify how to deliver the notifications when conflicts arise between the plurality of rules,
    means for evaluating the one or more user contexts;
    means for evaluating specified elements from the first group of specified elements to determine dynamic contexts; and means for controlling the delivery of notifications that do not contain at least a specified element from the second group of specified elements in accordance with the evaluated user contexts.

10. The system of claim 9, further comprising a means for making the one or more rules available to the user for modification in accordance with the preferences of the user.

11. The system of claim 9, further comprising a means for determining a state of the first condition by a declaration of the first condition.

12. The system of claim 9, further comprising a means for determining a state of the first condition by a delivery of a notification.

13. The system of claim 9, further comprising a means for carrying out the delivery instruction that comprises at least one of routing, denying, deferring, or delivering a notification.

* * * * *